(12) United States Patent
Barkdoll

(10) Patent No.: US 8,172,930 B2
(45) Date of Patent: May 8, 2012

(54) CLEANABLE IN SITU SPARK ARRESTOR

(75) Inventor: Michael P. Barkdoll, Knoxville, TN (US)

(73) Assignee: SunCoke Technology and Development LLC, Lisle, IL (US)

( * ) Notice: Subject to any disclaimer, the term of this patent is extended or adjusted under 35 U.S.C. 154(b) by 564 days.

(21) Appl. No.: 12/403,391

(22) Filed: Mar. 13, 2009

(65) Prior Publication Data

US 2010/0229727 A1    Sep. 16, 2010

(51) Int. Cl.
*B01D 45/00* (2006.01)

(52) U.S. Cl. ........... 96/232; 55/320; 55/440; 55/443; 55/DIG. 20; 110/119; 110/216

(58) Field of Classification Search .......... 55/334, 55/341.1–341.7, 368, 385.4, 320, 385.5, 55/418, 440, 443, DIG. 20; 96/232, 233, 96/268; 110/113–129, 203–217
See application file for complete search history.

(56) References Cited

U.S. PATENT DOCUMENTS

| | | | |
|---|---|---|---|
| 2,394,173 A | 2/1946 | Harris et al. | |
| 2,902,991 A | 9/1959 | Whitman | |
| 3,917,458 A * | 11/1975 | Polak | 422/169 |
| 4,145,195 A * | 3/1979 | Knappstein et al. | 96/232 |
| 4,147,230 A | 4/1979 | Ormond et al. | |
| 4,222,748 A * | 9/1980 | Argo et al. | 95/64 |
| 4,307,673 A * | 12/1981 | Caughey | 110/119 |
| 4,330,372 A | 5/1982 | Cairns et al. | |
| 4,336,843 A | 6/1982 | Petty | |
| 4,655,193 A | 4/1987 | Blacket | |
| 4,655,804 A * | 4/1987 | Kercheval et al. | 55/324 |
| 6,699,035 B2 | 3/2004 | Brooker | |
| 2006/0102420 A1 | 5/2006 | Huber et al. | |
| 2007/0047166 A1 | 3/2007 | Creel | |

* cited by examiner

*Primary Examiner* — Duane Smith
*Assistant Examiner* — Thomas McKenzie
(74) *Attorney, Agent, or Firm* — Luedeka Neely Group, LLC

(57) ABSTRACT

A system for reducing the occurrence of fires in a fabric filter dust collection system. The system includes an elongated housing having a first end and a second end distal from the first end. A gas flow inlet is provided in flow communication with an interior portion of the housing for flow of gas and particulates from a source into the housing. A gas flow outlet is provided in flow communication with the housing for flow of gas and particulates out of the housing and into the dust collection system. An elongated spark arrestor is disposed in the housing between the first end and the second end. The spark arrestor has a plurality of spaced-apart, wedge-shaped members having a gap between adjacent members sufficient to interrupt the flow of combustible particles from the source to the dust collection system.

20 Claims, 4 Drawing Sheets

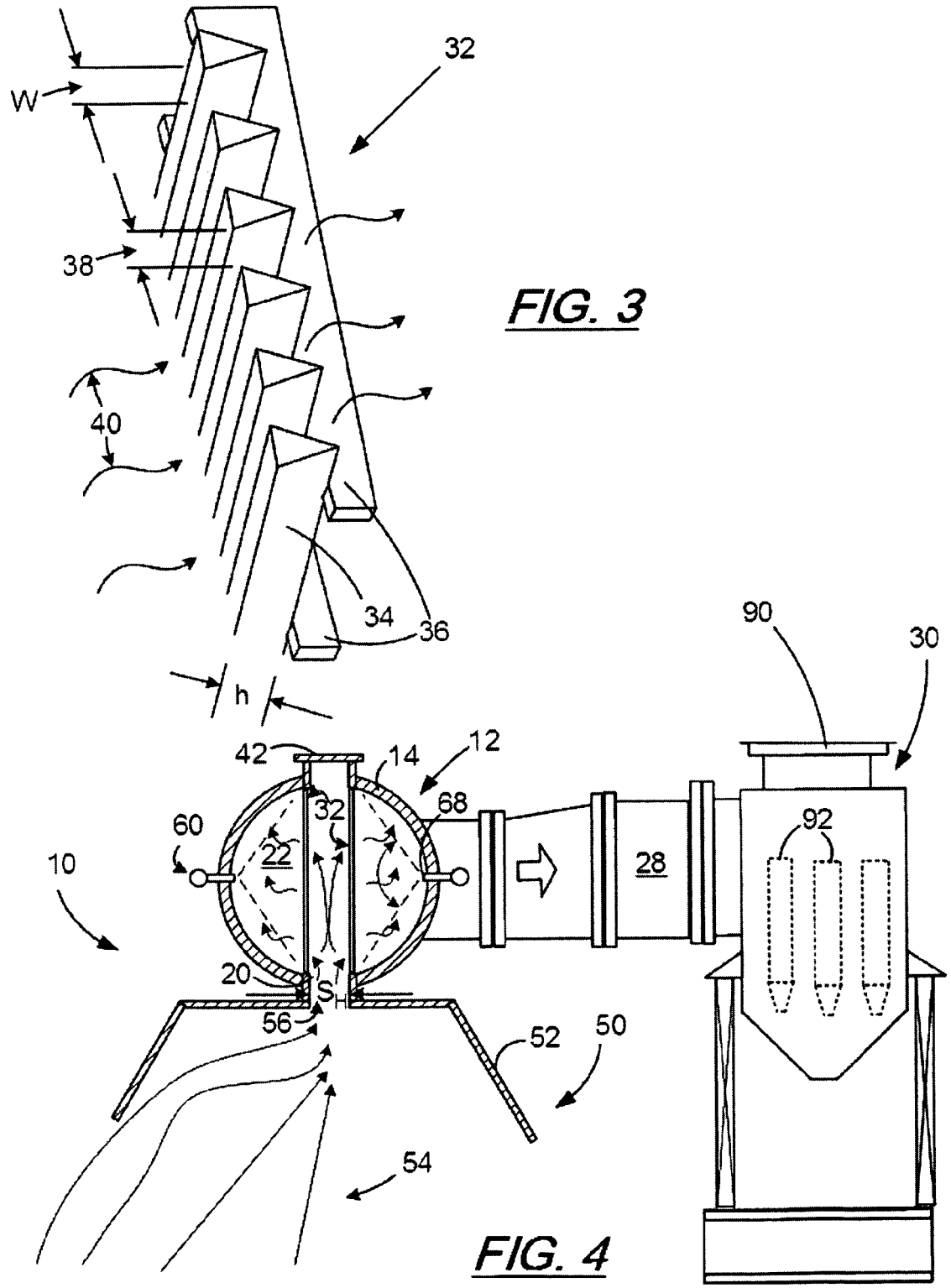

US 8,172,930 B2

CLEANABLE IN SITU SPARK ARRESTOR

TECHNICAL FIELD

The disclosure relates to dust collection systems and in particular to systems that include cleanable spark arrestors between a source of sparks and a combustible material such as a dust collection bag house.

BACKGROUND

A spark arrestor is a generic term used to describe a device that is intended to prevent combustible materials, such as sparks, from escaping into areas that could result in ignition and fire. The most recognized spark arrestors are those wire mesh devices used as chimney caps on chimneys or vent pipes for fireplaces and wood stoves in houses and buildings. By contrast, flame arrestors, such as those devices that are an integral part of a muffler assembly of an "off the road" vehicle, are used to prevent flames from escaping the mufflers and causing fires.

With the advent of more stringent air pollution control requirements for many industries, bag houses containing fabric filters are typically the devices of choice for capturing particulate matter. However, industrial applications that produce air-borne sparks as well as dust and particulates cannot use bag houses or fabric filter materials due to the potential for fabric filter fires without the use of an effective spark arresting device. Spark arresting devices that have been used with limited success, depending on the gas flow volumes and particles sizes have included drop out boxes, baffles, wire mesh, submerged dip tubes, cyclone separators, multi-cyclone separators, and sensors for activating water sprays. However, sensors and water spray systems are not 100 percent effective and often fail due to a variety of factors including misalignment, dirt build up, corrosion, or other causes.

Despite the variety of devices currently available, there continues to be a need for a spark arrestor that is effective to meet certain critical design criteria for industrial applications where fires and explosions cannot be tolerated and where there must be minimum downtime for the spark arrestor and dust collection system. Industries that may generate sparks that could cause fire or explosions, include, but are not limited to metal foundries for metal reclaiming and processing including high temperature melt lines, metal shredding, metal grinding, metal welding, and polishing of metal parts; fiber and particleboard including processing of the fiber and the particleboard as well as sawing and sanding of finished board; chemical industries that use spray dryers and the pneumatic conveying of the various dusts and powders; food processing industries such as coffee, chocolate, tobacco drying, spice and seasoning grinding, and the pneumatic conveying of powdered food products. Also included are all types of industrial combustion sources.

SUMMARY

In view of the above, the disclosure provides a spark arrestor, a dust collection system, and a pollution control system that is effective for substantially eliminating dust collection bag house fires. The spark arrestor includes a housing and a plurality of elongated, spaced-apart wedge-shaped members attached to an elongated backing member disposed in a gas flow area of the housing. The wedge-shaped members have a minimum gap between adjacent wedge-shaped members ranging from about 50 to about 400 microns.

In another embodiment, the disclosure provides a system for reducing the occurrence of fires in a fabric filter dust collection system. The system includes an elongated housing having a first end and a second end distal from the first end. A gas flow inlet is provided in flow communication with an interior portion of the housing for flow of gas and particulates from a source into the housing. A gas flow outlet is provided in flow communication with the housing for flow of gas and particulates out of the housing and into the dust collection system. An elongated spark arrestor is disposed in the housing between the first end and the second end. The spark arrestor has a plurality of spaced-apart, wedge-shaped members having a gap between adjacent members sufficient to interrupt the flow of combustible particles from the source to the dust collection system.

Another embodiment of the disclosure provides a pollution control system for a coke oven charging process. The system includes a hood disposed over a coke oven door for collecting dust, sparks and fumes from the oven as coal is charged to the oven. An elongated housing is attached to an outlet vent of the hood. The housing has a first end and a second end distal from the first end, a gas flow inlet in flow communication with an interior portion of the housing for flow of gas and particulates from the hood into the housing, a gas flow outlet in flow communication with the housing for flow of gas and particulates out of the housing and into the dust collection system, and an elongated spark arrestor disposed in the housing between the first end and the second end. The spark arrestor has a plurality of spaced-apart, wedge-shaped members having a minimum gap between adjacent members sufficient to interrupt the flow of combustible particles from the source to the dust collection system. A dust collection system is provided in flow communication with the gas flow outlet of the housing.

Advantages of the spark arrestor described herein may include the substantial elimination of 100 percent of sparks of a specific minimum size, substantially continuous operation of the spark arrestor with essentially no downtime for maintenance, minimized pressure drops for gas flows through the spark arrestor ranging from about 140 to about 1400 cubic meters per minute, an ability of the spark arrestor to handle relatively high fluctuating temperatures up to about 550° C., and the provision of a mechanically robust spark arrestor that is suitable for industrial applications.

Further advantages of the invention will become apparent by reference to the detailed description of preferred embodiments when considered in conjunction with the drawings, which are not to scale, wherein like reference characters designate like or similar elements throughout the several drawings as follows:

FIG. 3 is a perspective view, not to scale, of a portion of a spark arrestor illustrating a wedge-shaped member of the spark arrestor according to the disclosure;

FIG. 4 is a schematic illustration of a hood and dust collection system including a spark arrestor according to the disclosure.

DETAILED DESCRIPTION OF EXEMPLARY EMBODIMENTS

In order to provide a spark arrestor that is suitable for industrial applications, it is desirable to provide a device and system that was suitable for meeting a number of critical design parameters. Of utmost concern is to provide a device and system that substantially eliminates the possibility of operational failures that could cause fires and/or explosions.

An effective design for a spark arrestor is directly related to a particle size for a spark particle. However, there are other independent variables that should be considered when designing a spark arrestor. For example, temperature of the spark particle, specific heat of the spark particle, combustibility of dust collected in a downstream dust collection system, and the combustibility of the dust collection material used in the downstream dust collection system are all important factors to consider for providing an effective spark arrestor system. Of the foregoing independent variables, the spark particle size, spark particle temperature, spark particles specific heat may be combined into a single variable referred to as "ignition energy."

A relationship between the ignition energy of the spark particles, the combustibility of the collected dust, and the combustibility of the dust collecting material may be used to determine a "maximum allowable spark diameter." In most prior art systems, such as those described above, inertial separation of the spark particle is relied on for the most part. However, inertial separation typically only removes the largest particles with high efficiency and does not provide removal of substantially all particles smaller than the maximum allowable spark diameter. For example, particle removal efficiency for a typical high efficiency cyclone is shown in the following table relative to particle size.

TABLE 1

| Stokes equivalent diameter particle size (μm) | Percent removal efficiency by weight |
|---|---|
| 1.50 | 5.24 |
| 2.50 | 13.34 |
| 3.50 | 21.96 |
| 4.50 | 30.08 |
| 5.50 | 37.41 |
| 6.50 | 43.89 |
| 7.50 | 49.58 |
| 8.50 | 54.57 |
| 10.0 | 60.94 |
| 11.50 | 66.19 |
| 13.50 | 71.84 |
| 17.00 | 79.08 |
| 21.00 | 84.76 |
| 27.00 | 90.08 |
| 32.00 | 92.81 |
| 42.00 | 95.93 |
| 62.00 | 98.40 |

As shown by the foregoing table, only particles approaching 62 microns in size can be removed with a high degree of certainty using a high efficiency cyclone. Accordingly, for a gas flow rate of 850 cubic meters per minute, the above high efficiency cyclone may have a pressure drop of 13.2 cm of water which may require a fan horsepower (hp) of about 40 hp. Such a cyclone may have an overall height of about 11 meters and a body diameter of 2 meters. Accordingly, a high efficiency cyclone not only has a relatively low removal efficiency for particles smaller than about 25 microns, but the device is relatively large and may require a relatively large amount of energy for operation.

Figure 1:
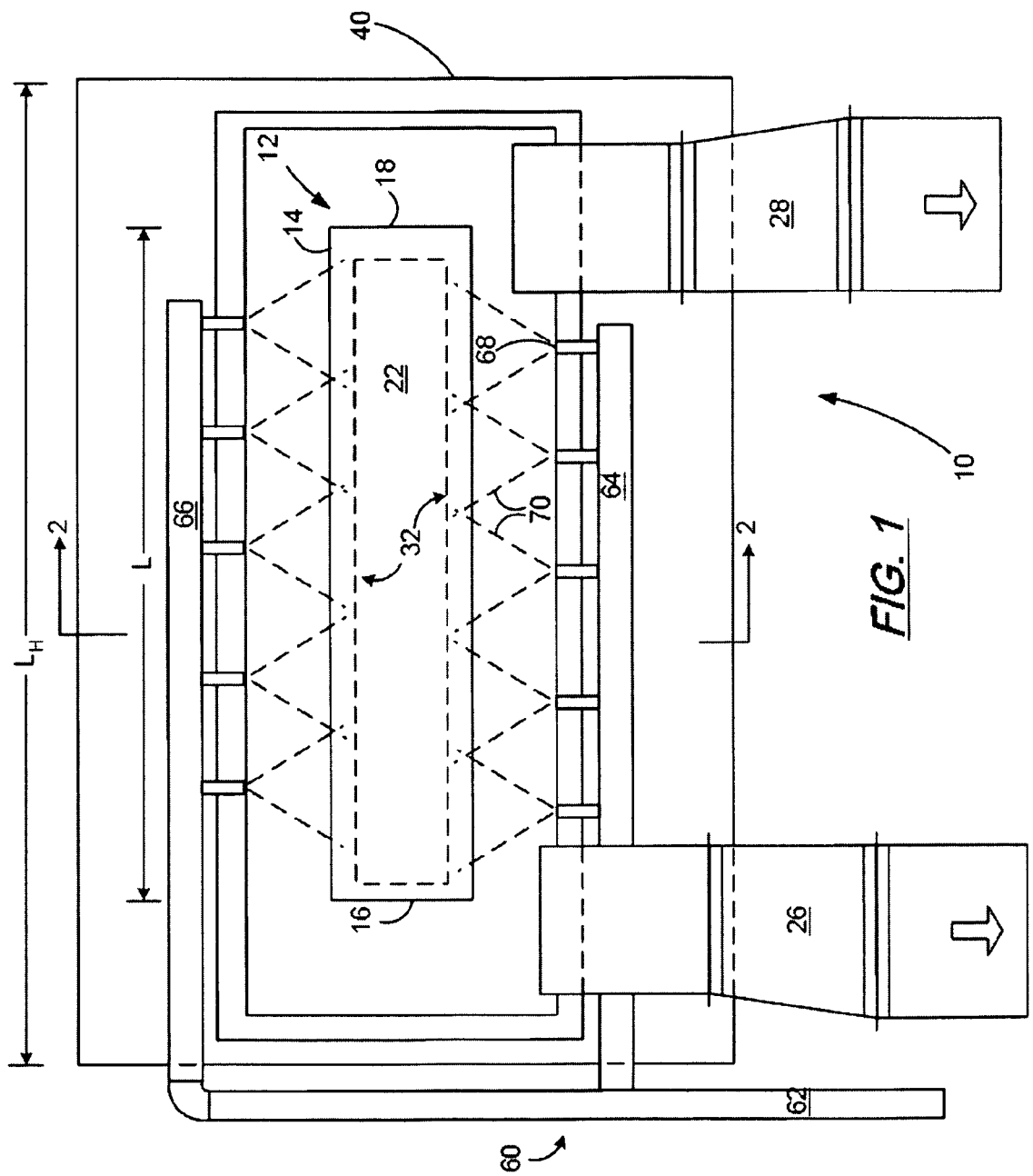
FIG. 1 is top plan view, not to scale, of a portion of a hood and spark arrestor for a dust collection system according to the disclosure.
Figure 2:
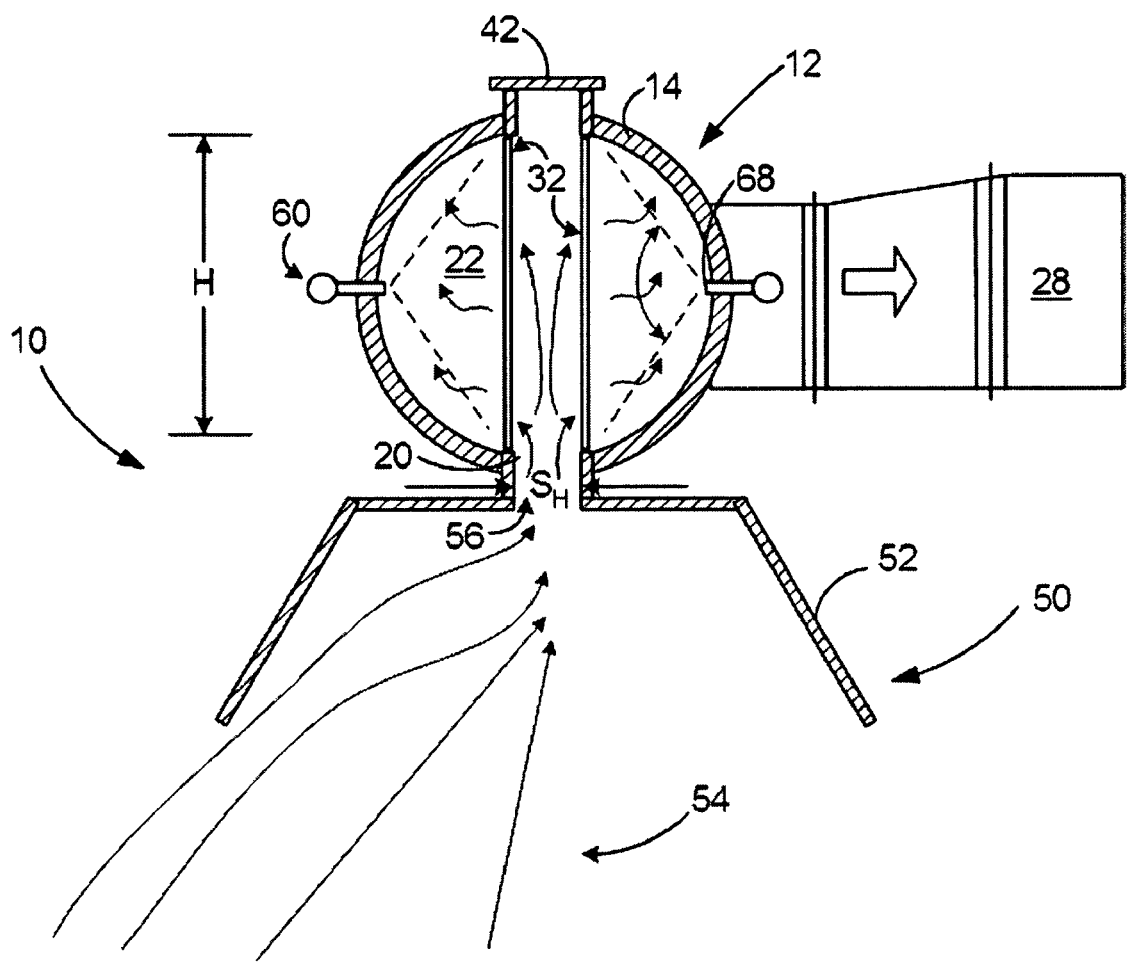
FIG. 2 is a cross-sectional view, not to scale, through a portion of the hood and spark arrestor of FIG. 1.

With reference now to FIGS. 1-3, a spark arrestor device and system according to the disclosure is illustrated. FIG. 1 is a top plan view, not to scale of a spark arrestor and hood system 10. The spark arrestor 12 component of the system 10 includes an elongated housing 14 having a first end 16 and a second end 18 distal from the first end 16. A gas flow inlet 20 (FIG. 2) is provided in the housing 14 for gas flow communication with an interior 22 of the housing 14. At least one gas flow outlet 26 adjacent to the first end 16 of the housing 14 is provided for flow of gas and particulates out of the housing 14 and into a dust collection system 30 (FIG. 4) coupled to the outlet 26. Depending on the gas flow rate through the system 10, a second gas flow outlet 28 may be included adjacent the second end of the housing 14.

Within the housing 14, there is disposed an elongated spark arrestor component 32 disposed between the first end 16 and the second end 18 of the housing 14. The spark arrestor component 32 includes a plurality of spaced-apart, wedge-shaped members 34 that are fixedly attached to an elongated backing member 36 to provide a substantially rigid spark arrestor component 32. The spark arrestor component 32 has a minimum gap 38 between adjacent wedge-shaped members 34 that is sufficient to interrupt the flow of spark particles from a source into the dust collection system 30. Depending on the particular application and flow rate requirements, the gap 38 may range from about 50 to about 500 microns to provide removal of substantially all spark particles smaller than the maximum allowable spark diameter defined above.

With specific reference to the spark arrestor component 32, all portions of the component 32 may be made of a corrosion resistant material such as galvanized steel, titanium, or stainless steel. The spark arrestor component 32 may have a height H ranging from about 0.3 meters to about 1.5 meters and a length L in the housing 14 ranging from about 1 meter to about 5 meters for gas flow rates ranging from about 7500 $m^3$/hr to about 170,000 $m^3$/hr. Each of the members 34 of the component 32 may have a width W ranging from about 0.5 millimeters to about 5.0 millimeters and a height h ranging from about 0.9 millimeters to about 9.0 millimeters.

As shown in FIG. 3, the spark arrestor component 32 inherently possesses a resistance to plugging by particles because of the wedge-shaped members 34 wherein flow through the spark arrestor component 32 is in the direction of arrows 40. By properly selecting a gap 38, the spark arrestor 32 may provide an absolute barrier to any sparks or hot debris that have a particle size greater than the gap 38 between adjacent members 34. The spark arrestor 12 may include a cover 42 for providing access to the interior 22 of the spark arrestor 12 for maintenance and repair of components of the spark arrestor 12.

In order to direct a flow of gas containing spark particles to the spark arrestor 12, an elongated slotted hood 50 may be used. The hood 50 includes a canopy 52 for capturing emissions from a source and directing the emissions, indicated by arrows 54 into the gas flow inlet 20 of the spark arrestor 12. As with the spark arrestor, the hood 50 may be made of a variety of materials including, but not limited to, galvanized steel, titanium, stainless steel, and the like. For the gas flow rates given above, the hood 50 may have an overall length $L_H$ of from about 1 meter to about 10 meters and a slot opening width $S_W$ ranging from about 18 millimeters to about 37 millimeters. The slot 56 in the hood 50 provides substantially even distribution of gas flow into the spark arrestor 12 so that particle removal efficiency is maintained for widely fluctuating gas flow rates.

Another important component of the spark arrestor 12 is a spray cleaning system 60. The spray cleaning system 60 includes a fluid inlet conduit 62 that provides flow of fluid to fluid headers 64 and 66 disposed on opposing sides of the spark arrestor 12. The fluid headers 64 and 66 provide fluid to a plurality of spray nozzles 68 disposed in the interior 22 of the housing 14. The spray nozzles 68 provide may provide a cone-shaped spray 70 with a cone angle ranging from about 100 to about 130 degrees for cleaning particles and debris that may accumulate on the members 34 of the spark arrestor component 32. The nozzles 68 may be made of stainless steel or other corrosion resistant material that can be used in high temperature applications and may provide a fluid flow ranging from about 4 liters per minute (LPM) to about 20 LPM at a pressure ranging from about 3.4 atmospheres to about 6.8 atmospheres. It is desirable that the cone-shaped sprays 70 overlap to cover the entire length L of the spark arrestor component 32. It is also desirable that the members 34 of the spark arrestor component 32 be oriented in a substantially vertical position so that the debris and particles washed from the members 34 may fall back down through the slot 56 in the hood 50.

The need for cleaning the spark arrestor component 32 may be determined on a case by case basis and may be dependent on whether or not the emissions contain sticky particulate matter. Accordingly, the spray nozzles 68 may be automatically or manually operated for intermittent cleaning of the spark arrestor component 32.

Figure 5:
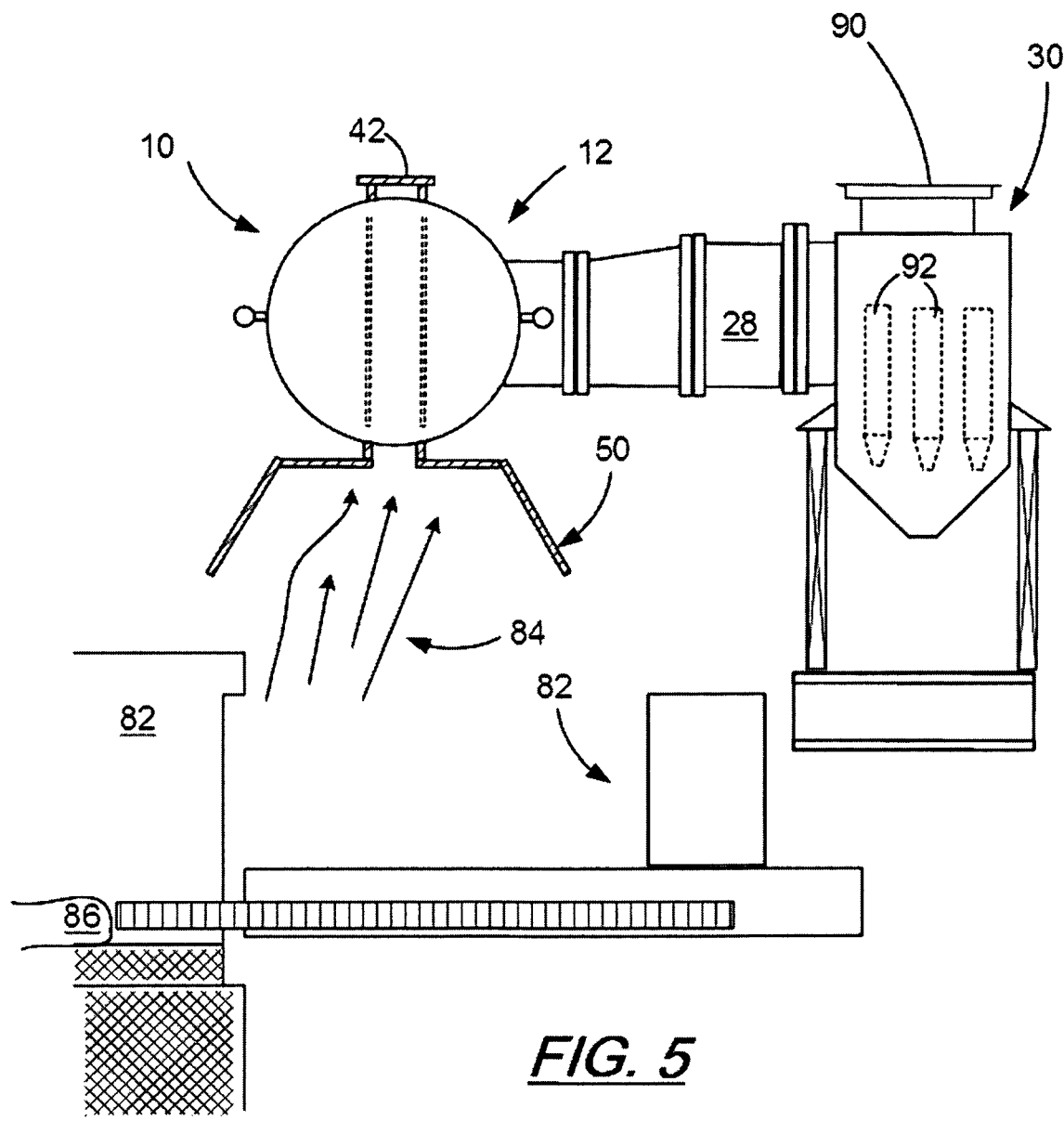
FIG. 5 is a schematic illustration of a coke oven charging system including a dust collection system and spark arrestor according to the disclosure.

One application of the spark arrestor system 10 according to the disclosure may be coke oven charging wherein the spark arrestor system 10 is adjacent an open oven 80 and charging machine 82 as illustrated schematically in FIG. 5. As the oven is charged incandescent coke and fumes 84 are emitted from the oven 80. As the coke oven 80 is charged with coke 86, a large volume of gas, fumes, and spark particles 84 are emitted from the oven 80. The fumes and spark parties are entrained in the gas 84 that is caused by the slotted hood 50 to flow through the spark arrestor 12 to remove spark particles and then to the dust collection system 30. Clean gas exits an outlet 90 of the dust collection system 30. Because the spark arrestor 12 eliminates substantially all of the spark particles, the dust collection system 30 containing bag filters 92 may be used. The bag filter dust collection system 30 is more effective in removing particulates from the gas stream generated by the coke oven charging process than other dust collection systems.

The foregoing embodiments are susceptible to considerable variation in its practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

What is claimed is:

1. A system for reducing the occurrence of fires in a fabric filter dust collection system, comprising:
    a source of emissions, the emissions comprising spark particles;
    an elongated housing having a first end and a second end distal from the first end;
    a gas flow inlet in flow communication with an interior portion of the housing for flow of gas and particulates from a source into the housing;
    a gas flow outlet in flow communication with the housing for flow of gas and particulates out of the housing and into the dust collection system; and
    an elongated spark arrestor disposed in the housing between the first end and the second end, the spark arrestor comprising a plurality of spaced-apart, wedge-shaped members having a minimum gap and a maximum gap between adjacent members sufficient to substantially interrupt the flow of spark particles from the source to the dust collection system, wherein the maximum gap is wider than the minimum gap.

2. The system of claim 1, further comprising a spark arrestor cleaning system attached to the housing for removing particles from the spark arrestor.

3. The system of claim 1, wherein the plurality of wedge-shaped members are disposed in the housing in a substantially vertical orientation.

4. The system of claim 1, wherein the minimum gap between adjacent wedge-shaped members ranges from 50 microns to about 400 microns.

5. The system of claim 1, wherein the spark arrestor is comprised of stainless steel materials.

6. The system of claim 1, wherein the dust collection system comprises a bag house having cloth filter bags therein.

7. The system of claim 1, further comprising a plurality of water spray nozzles in the housing for cleaning the spark arrestor.

8. The system of claim 1, further comprising a hood for collection of gas containing sparks and particulate matter for directing flow into the housing and through the spark arrestor.

9. A pollution control system for a coke oven charging process, comprising:
    a source of emissions, the emissions comprising spark particles;
    a hood disposed over an open coke oven door for collecting the spark particles, dust, sparks and fumes from the charging of coal into the coke oven;
    an elongated housing attached to an outlet vent of the hood, the housing having a first end and a second end distal from the first end;
    a gas flow inlet in flow communication with an interior portion of the housing for flow of gas, the spark particles and particulates from the hood into the housing;
    a gas flow outlet in flow communication with the housing for flow of gas, the spark particles and particulates out of the housing and into the dust collection system; and
    an elongated spark arrestor disposed in the housing between the first end and the second end, the spark arrestor comprising a plurality of spaced-apart, wedge-shaped members having a minimum gap and a maximum gap between adjacent members sufficient to substantially interrupt the flow of the spark particles from the source to the dust collection system, wherein the maximum gap is wider than the minimum gap; and
    a dust collection system in flow communication with the gas flow outlet of the housing.

10. The system of claim 9, further comprising a spark arrestor cleaning system attached to the housing for removing particles from the spark arrestor.

11. The system of claim 9, wherein the plurality of wedge-shaped members are disposed in the housing in a substantially vertical orientation.

12. The system of claim 9, wherein the minimum gap between adjacent wedge-shaped members ranges from 50 microns to about 400 microns.

13. The system of claim 9, wherein the spark arrestor is comprised of stainless steel materials.

14. The system of claim 9, wherein the dust collection system comprises a base house having cloth filter bags therein.

15. The system of claim 9, further comprising water spray nozzles in the housing for spraying and cleaning the spark arrestor.

16. A spark arrestor for capturing spark particles from a source of emissions, the emissions comprising spark particles, the spark arrestor comprising:
- a housing and a plurality of elongated, spaced-apart wedge-shaped members attached to an elongated backing member disposed in a gas flow area of the housing, the gas flow area configured to receive the spark particles,
- wherein the wedge-shaped members attached to an elongated backing member are disposed in a the gas flow area of the housing,
- wherein the wedge-shaped members have a minimum gap, and a maximum gap between adjacent wedge-shaped members sufficient to substantially interrupt the flow of the spark particles, wherein the minimum gap ranges from about 50 to about 400 microns, and wherein the maximum gap is wider than the minimum gap.

17. The spark arrestor of claim 16, wherein the plurality of wedge-shaped members are disposed in the housing in a substantially vertical orientation.

18. The spark arrestor of claim 16, wherein the spark arrestor is comprised of stainless steel materials.

19. The spark arrestor of claim 16, further comprising a plurality of water spray nozzles disposed in the housing for cleaning the spark arrestor.

20. The spark arrestor of claim 19, wherein the water spray nozzles provide a cone-shaped spray with a cone angle of about 120 degrees.

* * * * *